(12) United States Patent
Meshenberg et al.

(10) Patent No.: US 6,738,976 B1
(45) Date of Patent: May 18, 2004

(54) METHOD, SYSTEM, AND APPARATUS TO MINIMIZE EXCEPTION HANDLING OVERHEAD FROM INVOKED FUNCTIONS

(75) Inventors: Ruslan Meshenberg, Santa Clara, CA (US); Salil Pradhan, Santa Clara, CA (US); Yuhua Luo, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/466,543

(22) Filed: Dec. 17, 1999

(51) Int. Cl.[7] .............................. G06F 9/46
(52) U.S. Cl. ...................... 719/318; 719/310
(58) Field of Search ................... 709/318, 310

(56) References Cited

U.S. PATENT DOCUMENTS 6,151,703 A * 11/2000 Crelier ........................ 717/5
6,247,169 B1 * 6/2001 DeLong ....................... 717/4
6,282,702 B1 * 8/2001 Ungar ....................... 717/148

OTHER PUBLICATIONS

Venners, Exception in Java, JavaWorld, Jul. 1998, pp. 1–21.*
Brown, ExceptionHandling, Dec. 26, 1998, pp. 1–5.*
Venners, How the Java virtual machine handles exceptions, JavaWorld, Jan. 1997, pp. 1–6.*
Bjarne Stroustrup, "The C++ Programming Language", Second Edition, 1991, AT&T Bell Telephone Laboratories Inc, pp. 293–324.*
Norton et al., "Java Programming", 1996 by Peter Norton, Chapter 8—Tying It All Together: Threads, Exceptions, and More.*
Zukowski, "Mastering Java 2", 1998 by Bybex, Chapter 7—Exception Handling.*

* cited by examiner

*Primary Examiner*—Thomas Lee
*Assistant Examiner*—Diem Cao
(74) *Attorney, Agent, or Firm*—Christine H. Smith

(57) ABSTRACT

A method, system, and apparatus for minimizing run-time exception handling overhead from invoked function calls. The present invention novelly minimizes execution of exception checking code and exception handling code in a caller when the callee is a compiled method. In the present embodiment the callee novelly treats the caller as a compiled method thereby enabling the callee to return to the exception handling label of the caller if an exception needs to be handled and to return and continue normal code execution if an exception does not need to be handled. Thereby the present invention minimizes execution of exception handling code in the caller. Further, the present embodiment novelly creates code with the layout of a compiled method when a caller is not a compiled method so that a compiled callee may treat its caller as a compiled method.

13 Claims, 5 Drawing Sheets

METHOD, SYSTEM, AND APPARATUS TO MINIMIZE EXCEPTION HANDLING OVERHEAD FROM INVOKED FUNCTIONS

FIELD OF THE INVENTION

The present invention relates generally to a method, system, and apparatus for minimizing run-time exception handling overhead from invoked function calls.

BACKGROUND OF THE INVENTION

Computer-based compiler technologies typically include operations that manage invocation of functions. The functions may be methods and the invoking method may be a caller and the invoked method may be a callee. Also, compiler technologies manage exception handling so that the occurrence of a hardware or software error condition during execution of code will change the normal flow of control in a program. An exception that occurs during the execution of a callee is typically handled by the caller upon return from the callee.

More particularly, when a caller receives a return transmission from a callee, a check for an exception is performed. Therefore, as shown in FIG. 1, even when both the caller and the callee are compiled methods 105 thereby making the callee capable of managing exception checking explicitly, the callee does not have sufficient information about the caller 101 to explicitly return to the caller exception handling code. Therefore, as shown in element 102, after the execution of a function call 330 (as shown in FIG. 3) from a compiled method 105 to another compiled method 105, the callee may encounter an exception as shown in element 104. Then the callee 103 determines if the method can handle the exception as shown in element 106. When the test of element 106 is true, the exception is handled and execution proceeds, as shown in 108, until the flow of execution returns to the caller as shown in element 110.

Alternatively, when the test of element 106 fails the callee 103 returns to the caller 101 as shown in element 110. Then the exception checking code of the caller 101 is executed as shown in element 112. More particularly, the test for the exception is performed by the caller as shown in element 114. If the test of element 114 is false then the exception handling label is executed as shown in element 116. Alternatively, if the test of element 114 is true normal execution continues as shown in element 118.

It would be useful if fewer checks for exceptions were required upon a return from a function call. More particularly, it would be useful if invoked compiled methods were able to avoid executing extra exception checking and handling code.

SUMMARY OF THE INVENTION

The present invention relates generally to a method, system, and apparatus for minimizing run-time exception handling overhead from invoked function calls.

The present embodiment novelly eliminates redundant exception checking code in a caller when the callee is a compiled method. More particularly, when the callee has encountered an exception during execution that it cannot handle, the callee explicitly returns to the exception handling label of the caller. Thereby the callee eliminates the execution of exception checking code in the caller method.

In the present embodiment the callee novelly treats the caller as a compiled method thereby enabling location of both the exception handling label and the point of normal execution that follows the exception handling code of the caller. Thereby the callee may return to the exception handling label of the caller if an exception needs to be handled and may return to the caller to continue normal code execution if an exception does not need to be handled. Therefore, the present embodiment novelly eliminates redundant execution of exception checking code and executes exception handling code only when it is necessary.

A compiled method is typically generated during the run-time portion of execution and a native method is typically generated during the compile-time portion of execution. Therefore, in the present embodiment the callee novelly takes advantage of the structure of a caller that is a compiled method to locate both the exception handling label and the point of normal execution that follows the exception handling code of the caller, and thereby eliminate execution of the exception checking code of the caller.

Further, the present embodiment novelly creates code with the layout of a compiled method when a caller is not a compiled method. Thereby the callee that is a compiled method eliminates redundant exception checking code in a caller regardless of whether the caller is a compiled method.

Other aspects and advantages of the present invention will become apparent from the following detailed description, taken in conjunction with the accompanying drawings, illustrating by way of example the principles of the invention.

BRIEF DESCRIPTION OF THE DRAWINGS

The accompanying drawings are incorporated in and constitute a part of this specification and, together with the description, explain the advantages and principles of the invention. In the drawings.

DETAILED DESCRIPTION

Figure 1:
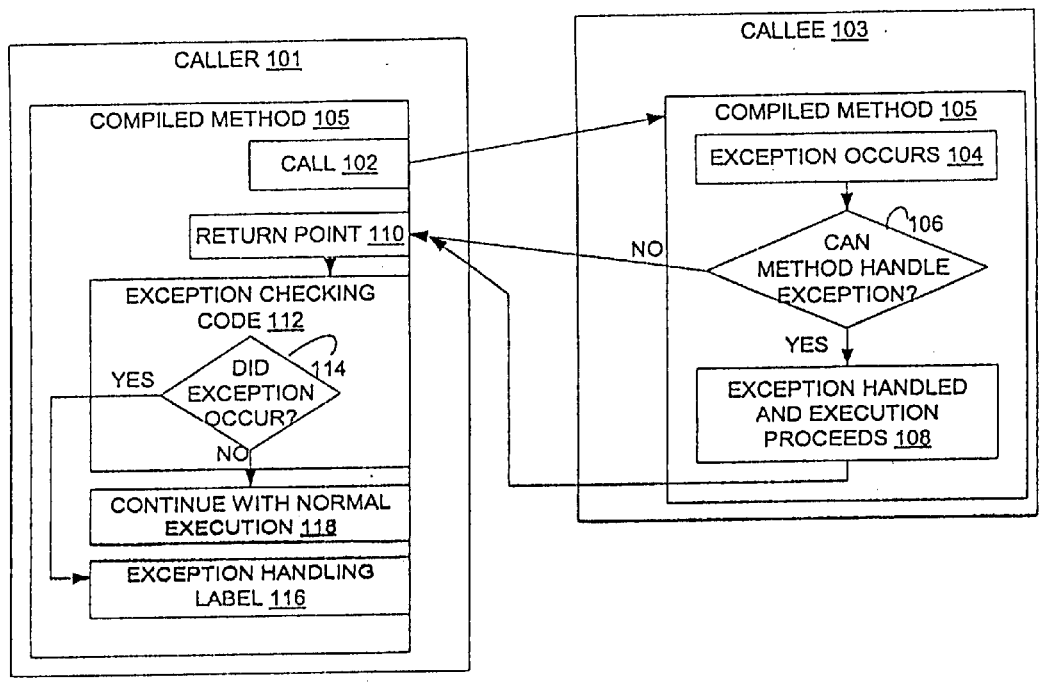
FIG. 1 is a timing diagram that illustrates the prior art of a caller and a callee.

In the following detailed description and in the several figures of the drawings, like elements are identified with like reference numerals.

Figure 2A:
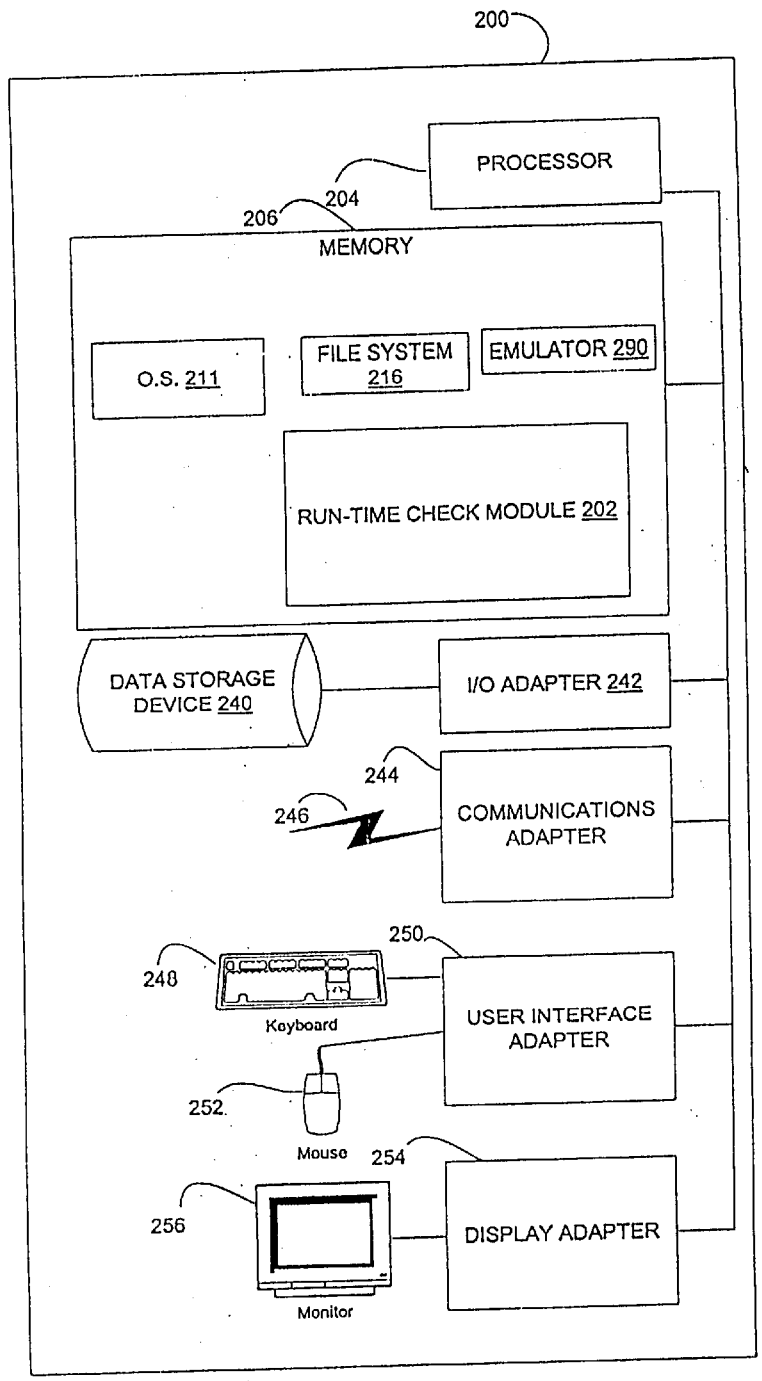
FIG. 2A is a block diagram that illustrates a computer system operating with the present embodiment.
Figure 3:
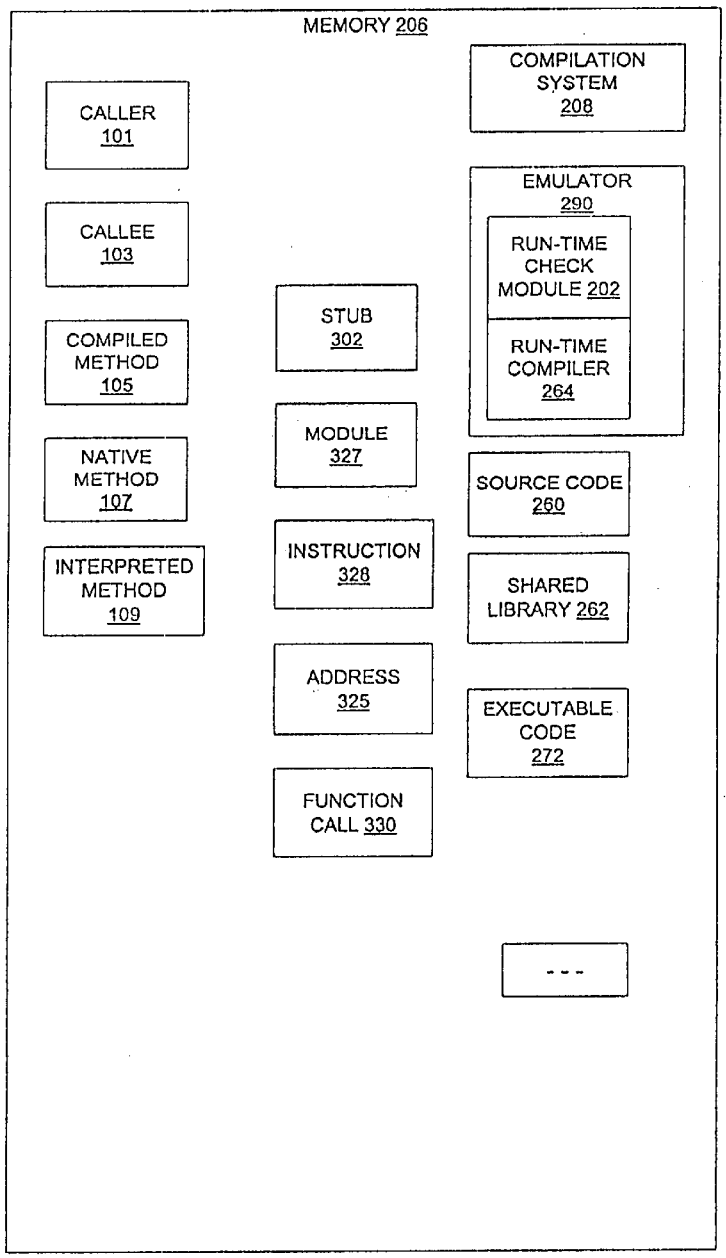
FIG. 3 is a block diagram that illustrates the computer readable memory used by the present embodiment.

Broadly stated, FIG. 2A is a block diagram that illustrates the run-time check module 202 that operates in a computer system 200 and that minimizes run-time exception handling overhead from invoked function calls 330 (as shown in FIG. 3). More particularly, the present embodiment novelly eliminates redundant exception checking code in a caller 101 when the callee 103 is a compiled method 105 (as are shown in FIG. 3). Further, in the present embodiment the callee 103 novelly treats the caller 101 as a compiled method 105 thereby enabling the callee 103 to locate both the exception handling label 116 and the point of normal execution 118 that follows the exception handling code 112 (as are shown in FIG. 1) of the caller 101. Therefore, in the present embodiment the callee 103 novelly takes advantage of the structure of a caller 101 that is a compiled method 105 and returns from an exception without redundant execution of caller exception checking code 112 or exception handling code. Further, the present embodiment novelly creates a stub 302 with the layout of a compiled method 105 when the caller 101 is an interpreted method 109, and creates a function call 330 to generate an interpreted method 109 when the caller 101 is a native method 108. Thereby the present embodiment enables the callee 103 to treat a caller 101 that is a native method 107 or an interpreted method 109 as a compiled method 105 (as are shown in FIG. 3).

A method may be used in an object-oriented language, and is a module 327 associated with at least one class. The term method may describe both the named operation and the code that is included in a specific class to perform the operation. An object oriented software technology includes objects that receive and send messages. Typically the object includes software code and data. An object is defined by a class that characterizes the attributes of the object. Therefore, an object is an individual instance of a class.

FIG. 2A further represents the computer system 200 that includes components such as a processor 204, memory 206, a data storage device 240, an I/O adapter 242, a communications adapter 244, a communications network 246, a user interface adapter 250, a keyboard 248, a mouse 252, a display adapter 254, and a computer monitor 256. It will be understood by those skilled in the relevant art that there are many possible configurations of the components of the computer system 200 and that some components that may typically be included in the computer system 200 are not shown.

It will be understood by those skilled in the art that the functions ascribed to the run-time check module 202, or any of its functional files, typically are performed by a central processing unit that is embodied in FIG. 2A as the processor 204 executing software instructions 328. The processor 204 typically operates in cooperation with software programs such as the operating system (O.S.) 211 and the run-time check module 202. Henceforth, the fact of such cooperation among the processor 204 and the run-time check module 202, whether implemented in software, hardware, firmware, or any combination thereof, may therefore not be repeated or further described, but will be understood.

The O.S. 211 may cooperate with a file system 216 that manages the storage of and access to files within the computer system 200. Files may include code such as instructions 328 or data. The interaction between the file system 216 and the O.S. 211 will be appreciated by those skilled in the art.

It will also be understood by those skilled in the relevant art that the functions ascribed to the run-time check module 202 and its functional files, whether implemented in software, hardware, firmware, or any combination thereof, may in some embodiments be included in the functions of the O.S. 211. That is, the O.S. 211 may include files from the run-time check module 202. In such embodiments, the functions ascribed to the run-time check module 202 typically are performed by the processor 204 executing such software instructions 328 in cooperation with aspects of the O.S. 211 that incorporate the run-time check module 202. Therefore, in such embodiments, cooperation by the run-time check module 202 with aspects of the O.S. 211 will not be stated, but will be understood.

The run-time check module 202 may be embodied in any computer-readable medium for use by or in connection with an instruction execution system, apparatus, or device, such as a computer system 200 or other system that can fetch the instructions 328 that may be included in computer-readable code. In the context of this document, a "computer-readable medium" can be any medium that can contain, store, communicate, propagate, or transport the program for use by or in connection with the instruction execution system, apparatus, or device. The computer-readable medium can be, for example but is not limited to, an electronic, magnetic, optical, electromagnetic, infrared, or semiconductor system, apparatus, device, propagation medium, or computer memory 206.

Computer memory 206 may be any of a variety of known memory storage devices or future memory devices, including any commonly available random access memory (RAM), cache memory, magnetic medium such as a resident hard disk, or other memory storage devices. In one embodiment the O.S. 211 and the run-time check module 202 may reside in the memory 206 during execution in the computer system 200. The term "storage" refers herein to computer resources such as the memory 206, and may be used to store data or instructions 328 used in executing a computer program. The O.S. 211 may also reside in the memory 206 when the run-time check module 202 is operating.

It will be appreciated that an emulator 290 may be included in the computer system 200. The operation of the run-time check module 202 that cooperates with an emulator 290 to minimize run-time exception checking will be discussed with reference to FIG. 2B.

The run-time check module 202 includes instructions 328 and data that may be referred to as values. The run-time check module 202 may be implemented in the programming language marketed under the trademark JAVA™ or the "C" programming language, although it will be understood by those skilled in the relevant art that other programming languages could be used. Also, the run-time check module 202 may be implemented in any combination of software, hardware, or firmware.

The data storage device 240 may be any of a variety of known or future devices, including a compact disk drive, a tape drive, a removable hard disk drive, or a diskette drive. Any such program storage device may communicate with the I/O adapter 242, that in turn communicates with other components in the computer system 200, to retrieve and store data used by the computer system 200. As will be appreciated, such program storage devices typically include a computer usable storage medium having stored therein a computer software program and data.

Input devices could include any of a variety of known I/O devices for accepting information from a user, whether a human or a machine, whether local or remote. Such devices include, for example a keyboard 248, a mouse 252, a touch-screen display, a touch pad, a microphone with a voice recognition device, a network card, or a modem. The input devices may communicate with a user interface I/O adapter 242 that in turn communicates with components in the computer system 200 to process I/O commands. Output devices could include any of a variety of known I/O devices for presenting information to a user, whether a human or a machine, whether local or remote. Such devices include, for example, the computer monitor 256, a printer, an audio speaker with a voice synthesis device, a network card, or a modem. Output devices such as the monitor 256 may communicate with the components in the computer system 200 through the display adapter 254. Input/output devices could also include any of a variety of known data storage devices 240 including a compact disk drive, a tape drive, a removable hard disk drive, or a diskette drive.

By way of illustration, program code may typically be loaded through an input device and may be stored on the data storage device 240. A copy of the code or portions of it, may alternatively be placed by the processor 204 into the memory 206 for execution in the computer system 200.

The computer system 200 may communicate with the network 246 through a data transmission communications adapter 244, such as a networking card. The network 246 may be a local area network, a wide area network, the internet, or another known computer network or future computer network. It will be appreciated that the I/O device used by the run-time check module 202 may be connected to the network 246 through the communications adapter 246 and therefore may not be co-located with the computer system 200. It will be further appreciated that other portions of the computer system 200, such as the data storage device 240 and the monitor 256, may be connected to the network 246 through the communications adapter 244 and may not be co-located.

Figure 2B:
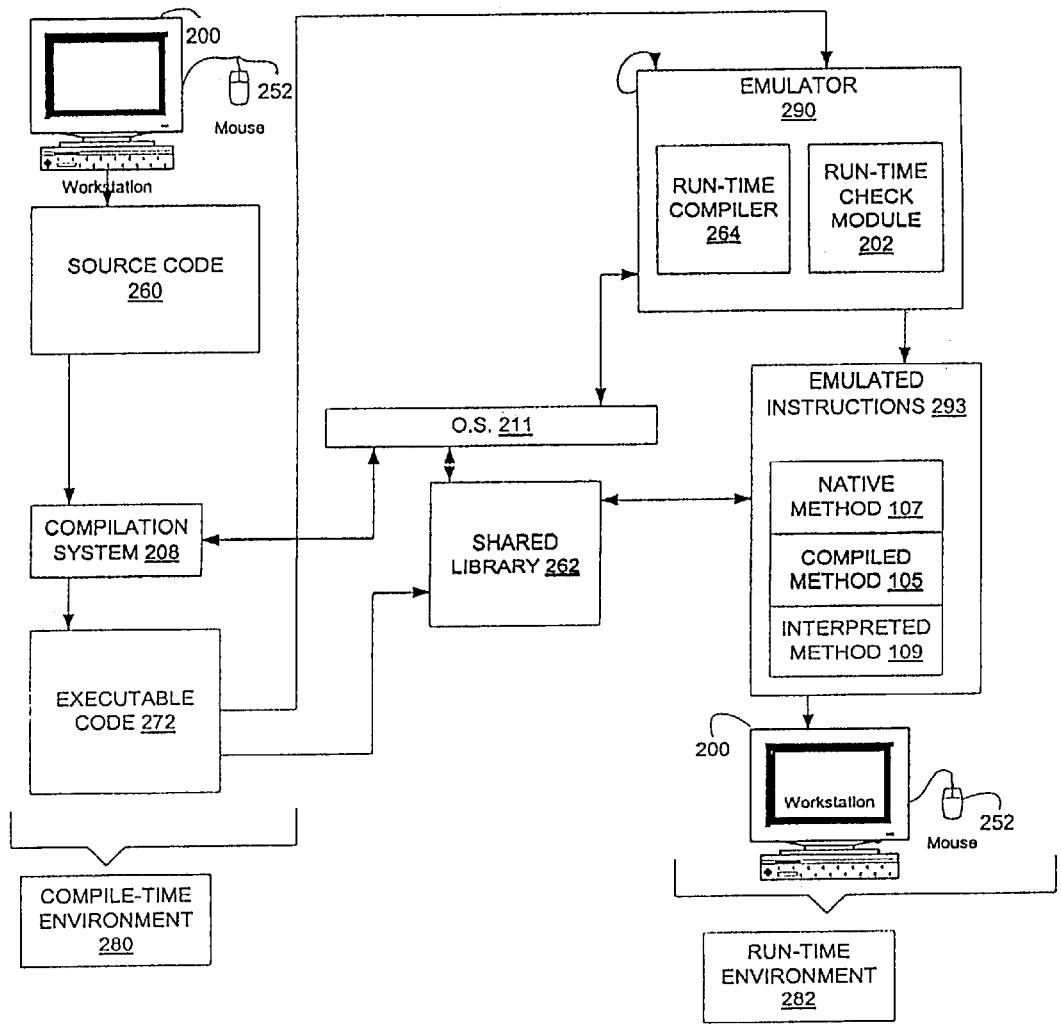
FIG. 2B is a block diagram that illustrates the present embodiment operating as a binary emulator.

FIG. 2B is a block diagram that illustrates the run-time check module 202 that cooperates with the emulator 290 to minimize run-time exception handling overhead from invoked function calls 330 (as shown in FIG. 3). It will be appreciated that the present embodiment operates on any computer system 200 and is not limited to the illustration herein. A software developer may create source code 260 typically in a high-level programming language such as "C," or the product marketed under the trademark JAVA™ that may be transformed into executable code 272, such as the product marketed under the trademark JAVA™ bytecode. Those skilled in the art will appreciate the use of bytecode. It will be appreciated that executable code 272 is typically created by a compilation system 208, typically during the compile-time portion of execution, as shown in element 280.

Executable code 272 may be capable of executing on the computer system 200 with I/O devices such as keyboard 248 (as shown in FIG. 2A) and a mouse 252. It will be appreciated that the input computer system 200 and the output computer system 200 may be the same computer system or different computer systems 200 and are not limited to the configuration illustrated.

The executable code 172 may be any of a variety of known executable files or an executable file of a type to be developed in the future. Examples of such known files are those having an extension of ".exe" operating under a DOS or Windows operating system or an "a.out" file of an O.S. 211 marketed under the trademark UNIX.® The present embodiment operates with executable code 172 of the type ".class" and ".jar" that are compatible with the product marketed under the trademark JAVA.™ Therefore, the run-time check module 202 that cooperates with the emulator 290 operates on executable code 272 generated from the product marketed under the trademark JAVA.™

Additional examples of executable code 172 are files having an extension of ".so" that are shared object files and ".sl" that are shared library 262 files. Such executable code 172 is typically generated by the compilation system 208 and is used in cooperation with emulated instructions 293.

A typical emulator may cooperate with the O.S. 211 and may operate, generally in an iterative manner, to create emulated instructions 293. It will be appreciated that the emulated instructions 293 may be associated with a hardware, software, or firmware representation of a different computer system 200. Further, it will be appreciated that emulation is the process of creating new instructions 328 from existing instructions 328 that typically execute on a different computer system 200 than the computer system 200 on which the instructions 328 originally existed. Emulation typically occurs during the run-time portion of execution, as shown in element 282.

In the present embodiment emulated instructions 293 include code that is a native method 107, a compiled method 105, or an interpreted method 109. A compiled method 105 is typically created from the run-time compiler 264 that operates in cooperation with the emulator 290 and compiles executable code 172, such as bytecode. A compiled method 105 typically includes references to locations of specific portions of code thereby enabling the callee 103 to locate both the exception handling label 116 and the point of normal execution 118 that follows the exception handling code 112 (as are shown in FIG. 1) of the caller 101. Therefore, in the present embodiment the callee 103 novelly takes advantage of the structure of a caller 101 (as are shown in FIG. 3) that is a compiled method 105 and returns to the caller 101 from an exception without redundant execution of caller exception checking code or exception handling code 112.

An interpreted method 109 is typically generated from bytecode and is interpreted by an emulator 290. The present embodiment creates a stub 302 (as shown in FIG. 3) with the layout of an associated compiled method 105 when the caller 101 is an interpreted method 109. Thereby the present embodiment enables the callee 103 to treat a caller 101 that is an interpreted method 109 as a compiled method 105. Therefore, the present embodiment enables the callee 103 to efficiently return to the caller 101. It will be appreciated that such a stub 302 may include variables that define data and instructions 328 (as shown in FIG. 3) used in the structure of the associated compiled method 105. Also, the stub 302 may contain information to manage the data and instructions 328 included in the associated compiled method 105. The stub 302 may also contain information required to locate and act on an exception that may occur during execution of the callee 103.

A native method 107 is written in code tailored to execute on a specific computer system 200. More particularly, the native method 107 is written in a form that operates in cooperation with instructions 328 tailored to execute on a particular computer system 200. Native methods 107 are typically generated from source code 260 such as "C," "C++," or assembly, by a compiler system 208, and in a static manner. Typically a native method 107 is stored in a shared library 262 that operates in cooperation with an emulator 290 and the O.S. 211.

The present embodiment may create a function call 330 to an interpreted method 109 associated with a caller 101 that is a native method 107. Thereby the present embodiment enables the callee 103 to treat a caller 101 that is a native method 107 as an interpreted method 109 that may then be treated as a compiled method 105. Therefore, the present embodiment enables the callee 103 to efficiently return to the caller 101. It will be appreciated that a native method 107 may be associated with an interpreted method 109 through the use of application programming interfaces (API's) that are defined for use with emulators 290, such as the product marketed under the trademark JAVA™ Virtual Machine. By means of example, the product marketed under the trademark JAVA™ Native Interface enables access and modification of native methods 107.

FIG. 3 illustrates data structures and modules 327 used by the run-time check module 202 that may be stored in the memory 206. Further, FIG. 3 represents memory-based computer structures that may be embodied in the memory 206 during the execution of the run-time check module 202.

The memory 206 includes the caller 101 and the callee 103 that may be modules 327 and the caller 101 invokes the callee 103. Also the memory 206 may include a compiled method 105, a native method 107, and an interpreted method 109 that are discussed with reference to FIG. 2B.

The memory 206 may include various types of computer-based code such as a stub 302, a module 327, an instruction 328, an address 325, and a function call 330. A stub 302 is typically a procedure that is used to interface information with a run-time library, such as a shared library 262. The stub 302 primarily prevents undefined references to addresses 325 during the process of executing code. A module or function 327 may refer to a software procedure such as a unit of code that may be independently compiled. The terms "module" and "function" will be used interchangeably herein. An instruction 328 may represent a computer address 325 and may also include parameters that are identifiers for values and may be embodied in computer-readable code. An address 325 may be a computer hardware register or a location in the memory 206. A value may include integer, real, or complex numbers; or characters, or may be a pointer that references values and thereby provides direction to locate a referenced value. A function call 330 is typically at least one instruction 328 that invokes execution of a module 327 other than the module 327 from which the function call 330 originated. The function call 330 typically changes the flow of execution from the originating module 327 to the invoked module 327.

The memory 206 may also include computer-based tools and code such as a compilation system 208, an emulator 290, source code 260, a shared library 262, and executable code 272. A compilation system 208 translates program code into instructions 328 that operate on the computer system 200. A shared library 206 is typically computer code that may be shared by a number of modules 327 and operates in cooperation with the compilation system 208. Source code 260 is typically created in a high-level programming language such as "C" and may be used to create executable code 272. Executable code 272 is capable of executing on a multi-purpose computer system 200.

An emulator 290 substitutes instructions 328 typically associated with different computer code or a different computer system 200. An emulator 290 may include a run-time check module 202 and a run-time compiler 264.

It will be appreciated that other data structures and modules 327 may be included in the memory during the operation of the present embodiment.

Figure 4:
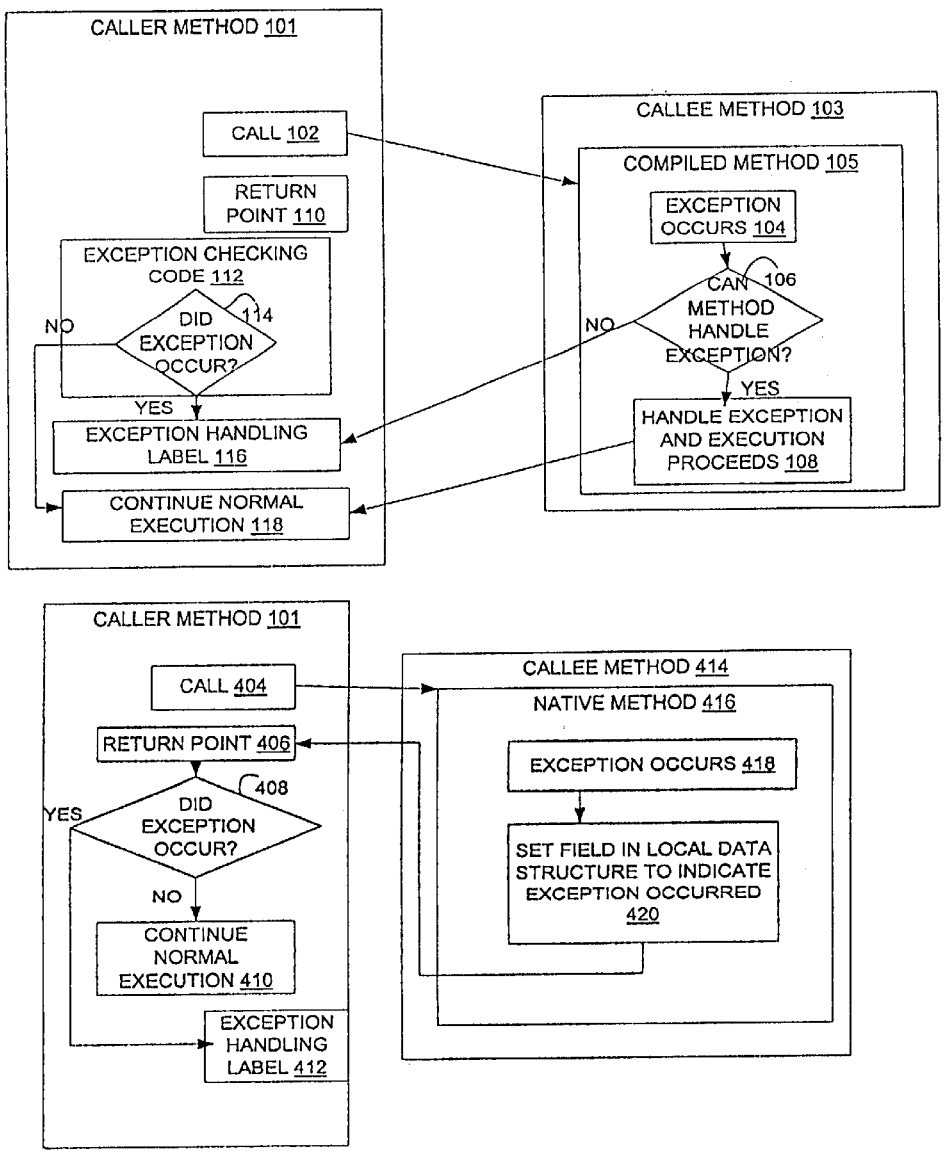
FIG. 4 is a timing diagram that illustrates the operation of the present embodiment.

FIG. 4 is a timing diagram that illustrates the operation of the present embodiment. When a caller method 101 calls a compiled method 105 the present embodiment will operate to minimize overhead due to exception checking. Therefore when a callee 103 is executed and thereupon an exception is encountered, as shown in element 104 a test will be conducted to determine if the method can handle the exception, as shown in element 106. If the test of element 106 is true then the callee method 103 handles the exception, as shown in element 108. Then the callee 103 returns to a location in the caller 101 that represents the normal return point 110 plus an offset to skip the exception checking code 112. Therefore, the callee returns to a point in the caller 101 where normal execution may continue, as shown in element 118.

Alternatively, if the test of 106 fails, the present embodiment novelly provides information to the compiled method 105 that is also the callee method 103. Therefore, the callee 103 has sufficient information to return to the exception handling label of the caller 101, as shown in element 116. Therefore, the present embodiment novelly reduces extra exception checking in the caller 101 when it bypasses the exception checking code 112 including the test of element 114.

When the caller method 101 makes a function call 330 (as shown in FIG. 3) to a callee 103, as shown in element 404, and the callee 103 is a native method 107 as shown in element 414 the present embodiment does not intervene. Therefore for the purpose of comparison, when an exception occurs in the native method 107, as shown in element 418 an attempt is made to handle the exception. If the exception cannot be handled a field will be set in a local data structure to indicate that an exception has occurred as shown in element 420. Then the callee 103 returns execution control to the caller 101 at the return point, as shown in element 406.

After the return point is reached, as shown in element 406, the code of the caller 101 will be executed. A test to determine if an exception occurred is conducted, as shown in element 408. If an exception did not occur, normal execution continues, as shown in element 410. If an exception occurred, the exception handling label is accessed, as shown in element 412.

The foregoing description, for purposes of explanation, used specific nomenclature to provide a thorough understanding of the invention. However, it will be apparent to one skilled in the art that the specific details are not required in order to practice the invention. In other instances, well known devices are shown in block diagram form in order to avoid unnecessary distraction from the underlying invention. The flow charts of the present embodiment show the architecture, functionality, and operation of an implementation of the present embodiment. In this regard, each block represents a module, segment, or portion of code, which comprises one or more executable instructions for implementing the specified logical function(s). It should also be noted that in some alternative implementations, the functions noted in the blocks may occur out of the order noted in the figures, or for example, may in fact be executed substantially concurrently or in the reverse order, depending upon the functionality involved.

Thus, the foregoing descriptions of specific embodiments of the run-time check module are presented for purposes of illustration and description. They are not intended to be exhaustive or to limit the invention to the precise forms disclosed, many modifications and variations are possible in view of the above teachings. Those skilled in the art will recognize that changes may be made in form and detail without departing from the scope of the invention. The invention is limited only by the claims.

What is claimed is:

1. A method in a computer system for minimizing handling of an exception in said computer system, said computer system including computer-readable code, said code being included in a caller and a callee that execute said code on said computer system, said method comprising:

invoking said callee by said caller;

identifying said caller selectively as a native method and an interpreted method of said computer-readable code;

treating said caller as a compiled method of said computer-readable code wherein said caller is selectively a compiled method and not a compiled method, thereby enabling said callee to efficiently return to said code of said caller;

executing said callee and thereupon encountering said exception;

when said callee cannot handle said exception:
  returning to said code of said caller that handles said exception thereby minimizing handling of said exception by said caller; and
when said callee can handle said exception:
  handling said exception by said callee; and
  returning to said code of said caller that continues normal execution of said code of said caller thereby minimizing handling of said exception by said caller.

2. A method in a computer system for minimizing handling of an exception in said computer system, said computer system including computer-readable code, said code being included in a caller and a callee that execute said code on said computer system, said method comprising:
  invoking said callee by said caller;
  identifying said caller selectively as a native method and an interpreted method of said computer-readable code;
  treating said caller as a compiled method of said computer-readable code wherein said caller is selectively a compiled method and not a compiled method, thereby enabling said callee to efficiently return to said code of said caller;
  executing said callee and thereupon encountering said exception; and
  when said callee can not handle said exception:
    returning to said code of said caller that handles said exception thereby minimizing handling of said exception by said caller.

3. A method in a computer system for minimizing handling of an exception in said computer system, said computer system including computer-readable code, said code being included in a caller and a callee that execute said code on said computer system, said method comprising:
  invoking said callee by said caller;
  identifying said caller selectively as a native method and an interpreted method of said computer-readable code;
  treating said caller as a compiled method of said computer-readable code wherein said caller is selectively a compiled method and not a compiled method, thereby enabling said callee to efficiently return to said code of said caller;
  executing said callee and thereupon encountering said exception; and
  when said callee can handle said exception:
    handling said exception by said callee; and
    returning to said code of said caller that continues normal execution of said code of said caller thereby minimizing handling of said exception by said caller.

4. A computer system for minimizing handling of an exception in said computer system, said computer system including computer-readable code, said code being included in a caller and a callee that execute said code on said computer system wherein said caller comprises selectively a native method and an interpreted method of said computer-readable code and wherein said caller is treated as a compiled method of said computer-readable code, wherein said caller is selectively a compiled method and not a compiled method, thereby enabling said callee to efficiently return to said code of said caller, said computer system performing a method comprising:
  said callee being invoked by said caller and being executed and thereupon encountering said exception;
  when said callee cannot handle said exception said callee returns to said code of said caller that handles said exception thereby minimizing handling of said exception by said caller; and
  when possible said callee handles said exception and returns to said code of said caller that continues normal execution of said code of said caller thereby minimizing handling of said exception by said caller.

5. A computer system for minimizing handling of an exception in said computer system, said computer system including computer-readable code, said code being included in a caller and a callee that execute said code on said computer system, said computer system performing a method comprising:
  said callee being invoked by said caller and being executed and thereupon encountering said exception; and
  when said callee cannot handle said exception said callee returns to said code of said caller that handles said exception thereby minimizing handling of said exception by said caller;
  wherein said callee treats said caller as selectively a native method and an interpreted method and wherein said caller is selectively a compiled method and not a compiled method.

6. A computer system for minimizing handling of an exception in said computer system, said computer system including computer-readable code, said code being included in a caller and a callee that execute said code on said computer system, said computer system comprising:
  said callee being invoked by said caller and being executed and thereupon encountering said exception; and
  when possible said callee handles said exception and returns to said code of said caller that continues normal execution of said code of said caller thereby minimizing handling of said exception by said caller; wherein said callee treats said caller as selectively a native method and an interpreted method, and wherein said caller is selectively a compiled method and not a compiled method.

7. A computer-readable medium containing instructions for causing a computer system to perform method acts for minimizing handling of an exception in said computer system, said computer system including a caller and a callee that include said instructions and that execute said instructions on said computer system, said method acts comprising:
  invoking said callee by said caller;
  identifying said caller as selectively a native method and an interpreted method of said instructions;
  treating said caller as a compiled method of said instructions thereby enabling said callee to efficiently return to said instructions of said caller, wherein said caller is selectively a compiled method and not a compiled method;
  executing said callee and thereupon encountering said exception;
  when said callee cannot handle said exception:
    returning to said instructions of said caller that handle said exception thereby minimizing handling of said exception by said caller; and
  when said callee can handle said exception:
    handling said exception by said callee; and
    returning to said instructions of said caller that continue normal execution of said instructions of said caller thereby minimizing handling of said exception by said caller.

8. A computer-readable medium containing instructions for causing a computer system to perform method acts for minimizing handling of an exception in said computer system, said computer system including a caller and a callee that include said instructions and that execute said instructions on said computer system, said method acts comprising:

invoking said callee by said caller;

executing said callee and thereupon encountering said exception; and when said callee cannot handle said exception:
returning to said instructions of said caller that handle said exception thereby minimizing handling of said exception by said caller;

wherein said callee treats said caller as selectively a native method and an interpreted method and wherein said caller is selectively a compiled method and not a compiled method.

9. A computer-readable medium containing instructions for causing a computer system to perform method acts for minimizing handling of an exception in said computer system, said computer system including a caller and a callee that include said instructions and that execute said instructions on said computer system, said method acts comprising:

invoking said callee by said caller;

executing said callee and thereupon encountering said exception; and when said callee can handle said exception:
handling said exception by said callee; and
returning to said instructions of said caller that continue normal execution of said instructions of said caller thereby minimizing handling of said exception by said caller;

wherein said callee treats said caller as selectively a native method and an interpreted method and wherein said caller is selectively a compiled method and not a compiled method.

10. A computer-readable data transmission medium containing a data structure for minimizing handling of an exception in a computer system, said computer system including computer-readable code, said code being included in a caller and a callee that execute said code on said computer system, said data transmission medium comprising:

a first portion invoking said callee by said caller;

a second portion executing said callee and thereupon encountering said exception;

when said callee cannot handle said exception:
a third portion returning to said code of said caller that handles said exception thereby minimizing handling of said exception by said caller; and when said callee can handle said exception:
a fourth portion handling said exception by said callee; and
a fifth portion returning to said code of said caller that continues normal execution of said code of said caller thereby minimizing handling of said exception by said caller;

wherein said callee treats said caller as selectively a native method and an interpreted method and wherein said caller is selectively a compiled method and not a compiled method.

11. A computer-readable data transmission medium containing a data structure for minimizing handling of an exception in a computer system, said computer system including computer-readable code, said code being included in a caller and a callee that execute said code on said computer system, said data transmission medium comprising:

a first portion invoking said callee by said caller;

a second portion executing said callee and thereupon encountering said exception; and when said callee cannot handle said exception:
a third portion returning to said code of said caller that handles said exception thereby minimizing handling of said exception by said caller;

wherein said callee treats said caller as selectively a native method and an interpreted method and wherein said caller is selectively a compiled method and not a compiled method.

12. A computer-readable data transmission medium containing a data structure for minimizing handling of an exception in a computer system, said computer system including computer-readable code, said code being included in a caller and a callee that execute said code on said computer system, said method comprising:

a first portion invoking said callee by said caller;

a second portion executing said callee and thereupon encountering said exception; and when said callee can handle said exception:
a third portion handling said exception by said callee; and
a fourth portion returning to said code of said caller that continues normal execution of said code of said caller thereby minimizing handling of said exception by said caller;

wherein said callee treats said caller as selectively a native method and an interpreted method and wherein said caller is selectively a compiled method and not a compiled method.

13. An article of manufacture comprising a program storage medium having computer-readable code embodied therein for minimizing handling of an exception in said computer system, said computer system including computer-readable code, said code being included in a caller and a callee that execute said code on said computer system, said article of manufacture comprising:

computer-readable code for invoking said callee by said caller and executing said callee and thereupon encountering said exception;

when said callee cannot handle said exception:
computer-readable code for returning from said callee to said code of said caller that handles said exception thereby minimizing handling of said exception by said caller; and when said callee can handle said exception:
computer-readable code for said callee handling said exception; and
computer-readable code for said callee returning to said code of said caller that continues normal execution of said code of said caller thereby minimizing handling of said exception by said caller;

wherein said callee treats said caller as selectively a native method and an interpreted method and wherein said caller is selectively a compiled method and not a compiled method.

* * * * *